United States Patent [19]

Sakaguchi et al.

[11] 4,288,181

[45] Sep. 8, 1981

[54] DIE-HEAD OF CUTTING MACHINES

[75] Inventors: Ryo Sakaguchi; Yoshiharu Ikenaka, both of Osaka, Japan

[73] Assignee: Rex Industries Co., Ltd., Osaka, Japan

[21] Appl. No.: 36,809

[22] Filed: May 7, 1979

[30] Foreign Application Priority Data

May 9, 1978 [JP] Japan .................................. 53-54027

[51] Int. Cl.³ .............................................. B23B 5/12
[52] U.S. Cl. .................................... 408/15; 10/96 R; 10/120; 408/149; 408/177
[58] Field of Search ............... 10/94, 96 R, 96 T, 120, 10/120.5 R, 120.5 AD, 121, 87; 408/148, 149, 176, 177, 12, 15, 73, 219, 221

[56] References Cited

U.S. PATENT DOCUMENTS

| | | | |
|---|---|---|---|
| 731,121 | 6/1903 | Nutthall | 408/177 X |
| 977,541 | 12/1910 | Oster | 408/176 |
| 1,176,812 | 3/1916 | Bradley | 408/177 |
| 1,701,846 | 2/1929 | Harrison | 10/96 R |
| 2,017,764 | 10/1935 | Mathias | 10/96 T |
| 2,549,543 | 4/1951 | Strickland | 408/148 X |
| 3,142,076 | 7/1964 | Brandt | 408/176 X |
| 3,165,768 | 1/1965 | Herbkersman | 10/87 |
| 3,648,313 | 3/1972 | Fohl | 10/96 R |
| 3,820,180 | 6/1974 | Birkestrand et al. | 10/94 |
| 3,977,032 | 8/1976 | Newall et al. | 10/96 R |

Primary Examiner—Ervin M. Combs
Attorney, Agent, or Firm—Merchant, Gould, Smith, Edell, Welter & Schmidt

[57] ABSTRACT

A die-head of a cutting machine having a pair of relatively rotatable annular plates which retractably hold therebetween cutting tools extending in radial directions, one of the plates being provided with a tool retracting lever which is pivotably mounted thereto and which is engaged by a slide which is slidably arranged on one plate and which tends to rotate together with the other plate by a spring force, the slide being slide to cause relative rotation between the two plates when the lever is pivotally moved by a workpiece which extends axially in the plates.

11 Claims, 8 Drawing Figures

DIE-HEAD OF CUTTING MACHINES

This invention relates to a cutting machine and, in particular, to a die-head thereof having an automatic tool retracting device for automatically retracting cutting tools back to their non-operating positions when the cutting operation is completed.

In conventional known cutting machines, such as a pipe cutter, an operator usually operates a die-head manually to withdraw the cutting tools provided on the die-head back to their non-operating positions when the cutting operation is completed. However, in such a case, the operator must always stand by the machine to oversee the completion of the cutting. Furthermore, the pipe to be cut tends to be subject to scratches, such as the so-called "tool marks" on the thread formed on the pipe by the cutting tools when the tools are retracted from the pipe, which in turn will cause a leakage of the fluid to be contained and passed in the pipe. In addition, since it is very difficult for an ordinary operator to cut a uniform length of threads on the pipes, a very highly skilled operator is required.

The object of the invention is to provide a die-head of a cutting machine which can automatically retract the cutting tools back to their non-operating positions when the desired cutting is completed.

Another object of the invention is to provide a die-head of a cutting machine which can effect a fine adjustment of the radial positions of the cutting tools.

The invention will be discussed below with reference to the accompanying drawings illustrating preferred embodiments of the invention, in which.

Figure 1:
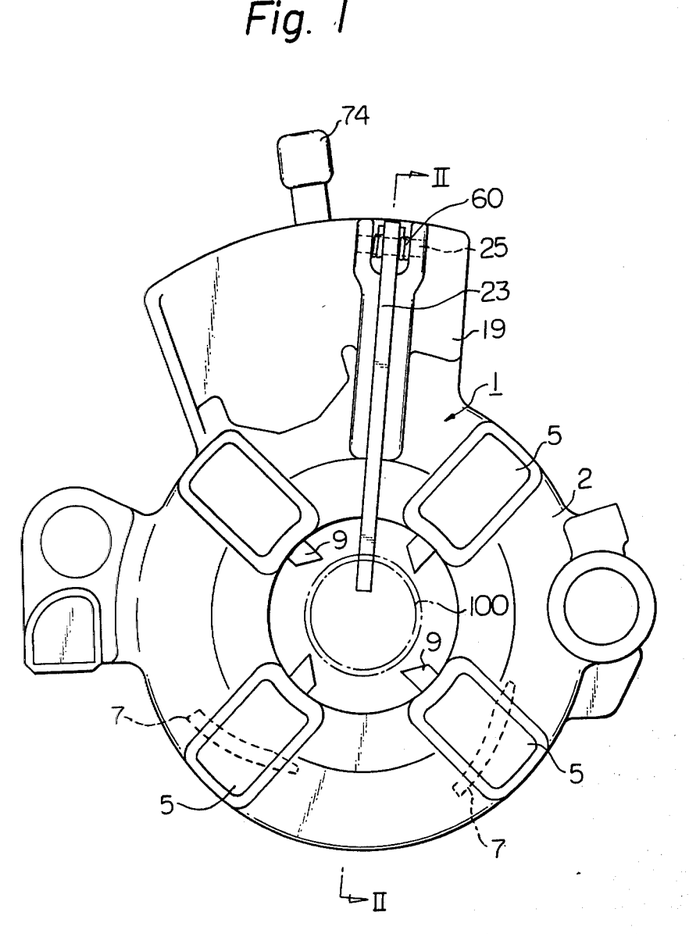
FIG. 1 is an elevational view of a die-head having an automatic tool retracting device, according to the present invention.

In FIG. 1 which illustrates a die-head for supporting cutting tools extending in radial directions, a die-head body 1 is supported on a carriage (not shown) of a cutting machine (not shown). The carriage is supported by and reciprocally moves along a pair of guide bars (not shown) which extend parallel to a workpiece 100 such as a pipe to be cut.

The die-head 1 has a pair of substantially opposing annular plates 2 and 3 (FIG. 2) which are rotatable relative to one another. One of the plates 2 and 3, e.g., the movable plate 3, has curved projections 7, the number of projections being equal to that of the cutting tools 9 (wherein the number of projections is four as shown in the illustrated embodiment), and the other stationary plate 2 includes cutting tools 9 each having a curved groove (not shown) corresponding to each of the curved projections 7. The cutting tools 9 are supported in supporting portions 5 which project outwardly from the outer surface of the plate 2. The cutting tools 9 can be radially displaced due to the engagement of the curved projections 7 and the corresponding curved grooves when a relative rotation occurs between the two plates 2 and 3. Since the scroll mechanism used for radially displacing the above-mentioned cutting tools is well known in the conventional cutting machine, no additional explanation for the mechanism is accordingly given herein.

Figure 2:
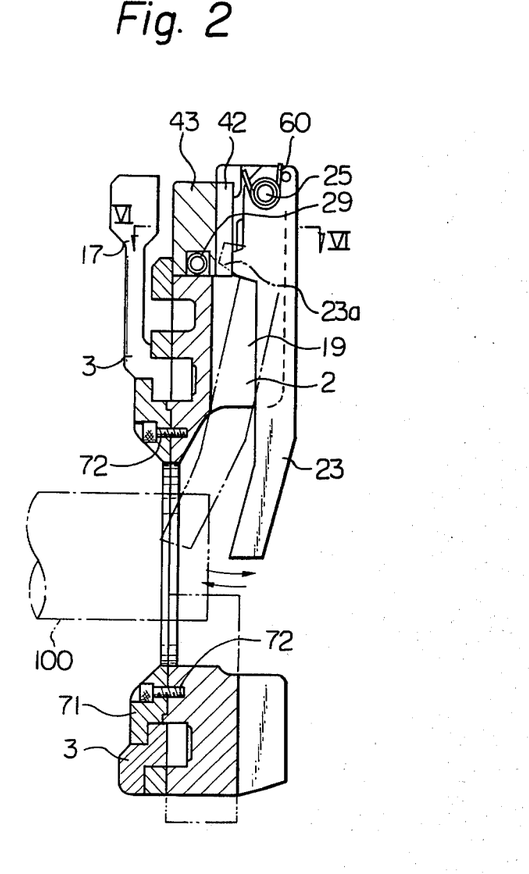
FIG. 2 is a sectional view taken along the line II—II in FIG. 1.

The radial position of the cutting tools 9 can be set at a desired position by the rotation of the plate 3 relative to the plate 2.

The plate 3 has a ledge 17 (FIG. 2) on its outer periphery.

Figure 3:
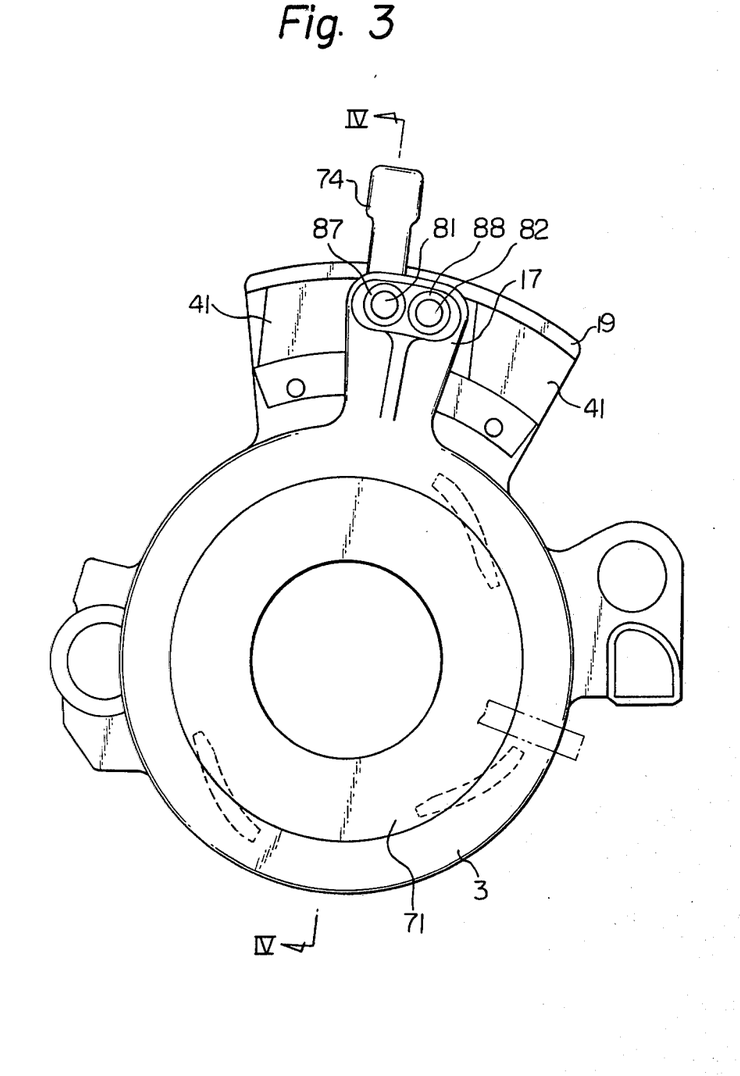
FIG. 3 is a back view of FIG. 1.

The plate 2 has a holding portion 19 which projects out from the periphery of the plate 2 and which has an inner peripheral curved channel 41 (FIGS. 3 and 4) in which a slide 43 (FIG. 2) is slidably fitted. The slide 43 slides in the curved channel 41 so as to move on the periphery of the plate 2.

Figure 5:
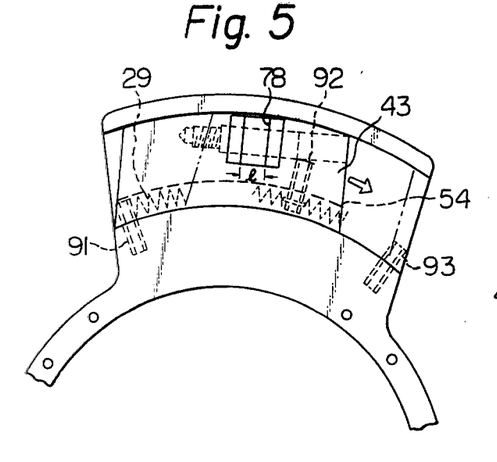
FIG. 5 is a view of a part of FIG. 3 with removed movable plate.

The slide 43 is spring-biased in a peripheral direction (in the clockwise direction of FIG. 5) by a spring 29 (FIGS. 2 and 5) which is arranged between a pin 91 secured to the plate 2 and a pin 92 secured to the slide 43. That is, a rotation force in the clockwise direction of FIG. 5 is provided to the slide 43 by means of the spring 29. To the pin 92 is secured one end of a damper spring 54 (FIG. 5) which strikes, at its free end, against a stopper pin 93 secured to the plate 2 in order to absorb a shock which occurs when a projection 23a of a tool retracting lever 23 to disengaged from a recessed groove 42 (FIG. 2) of the slide 43 so that the slide 43 is moved by the spring 29, as will be discussed hereinafter.

The tool retracting lever 23 is, at its upper portion, provided to the plate 2 by means of a pivot shaft 25 so that it can rotate about the pivot shaft 25. A return spring 60 is provided on the pivot shaft 25 to bias the lever 23 always in the clockwise direction of FIG. 2.

Figure 6:
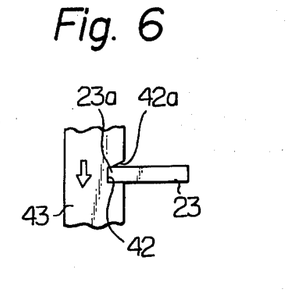
FIG. 6 is a sectional view taken along the line VI—VI in FIG. 2.

The lever 23 is provided, on its upper portion, with the projection 23a which is adapted to be engaged in the groove 42 of the slide 43 and which serves as a stop for preventing the movement of the slide 43. The groove 42 is of a shape which corresponds to the shape of the projection 23a of the lever 23, and is provided with an inclined portion 42a as shown in FIG. 6 so as to gradually displace the slide 43 so that the pipe is free from the "tool marks" which would be otherwise formed on the pipe. The inclined portion of 42a also contributes to the formation of a tapered thread on the pipe 100. The method of cutting such a tapered thread will be discussed hereinafter. As is apparent from the above description, the slide 43 which tends to be rotated in the peripheral direction by the spring 29 can thus be maintained at its initial position by the stop projection 23a of the lever 23.

The plate 3 is rotatably held by an inner ring plate 71 (FIG. 4) which is secured to the plate 2 by means of screws 72. That is, the plate 3 can rotate between the plate 2 and the shoulder of the ring plate 71.

The slide 43 has a U-shaped upper channel (not shown) in which a pivot arm 74 (FIG. 4) is pivoted. That is, the pivot arm 74 can rotate about a pivot pin 75 which extends between the opposite side walls of the slide that define the above-mentioned U-shaped channel. The pivot arm 74 is provided, on its bottom, with a small semi-spherical recess 76 (FIG. 4) for positioning the slide 43, into which is fitted a positioning ball 77 provided in the slide 43. The positioning ball 77 is always pressed upward by the spring 73, but does not separate from the slide 43. Since this kind of positioning ball mechanism is well known, no detailed explanation thereof is accordingly given herein. When the pivot arm 74 is rotated from a position 74' designated by the dotted-dashed lines to the position 74 designated by solid lines in FIG. 4, the positioning ball 77 is fitted and fixed into the recess 76 at the bottom of the pivot arm 74. Furthermore, the pivot arm 74 has a tapered side groove 78 (FIGS. 4 and 5) having a U-shaped cross section. (In FIG. 5, only the position of the tapered groove 78 of the arm 74 is illustrated). The width l (FIG. 5) of the tapered groove 78 is substantially equal to the diameter D (FIG. 4) of the front end of the eccentric pin 86, as will be discussed below.

Figure 4:
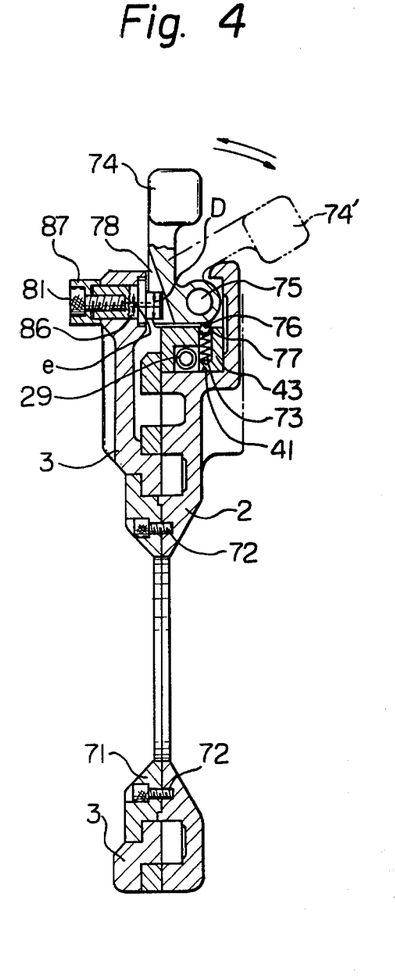
FIG. 4 is a sectional view taken along the line IV—IV in FIG. 3.

For example, two eccentric pins 86 (only one of which is shown in FIG. 4) are provided in the ledge 17 of the plate 3. To the eccentric pins are secured knobs 87 and 88 (FIG. 3) by means of screws 81 and 82, respectively, so that the rotational movement of the knobs 87 and 88 causes the eccentric pins to rotate. The eccentric pins 86 are adapted for connecting the plate 3 to the pivot arm 74 and accordingly to the slide 43, and for effecting a fine adjustment of the relative position between the plates 2 and 3 and, accordingly, a fine adjustment of the radial position of the cutting tools 9. That is, when the eccentric pins 86 are selectively engaged in the tapered groove 78 of the pivot arm 74, the plate 3 is connected to the latter. When the pivot arm 74 is in the position designated by the solid lines shown in FIG. 4, the plate 3 is integrally connected to the slide 43, since the pivot arm 74 is integrally connected to the slide 43. In this position, when the knob 87 or 88 is rotated so as to rotate the corresponding eccentric pin 86, an integral part consisting of the eccentric pin 86 and the plate 3 is rotated through an angle corresponding to an eccentricity "e" (FIG. 4), with respect to the plate 2.

The number and the position of the eccentric pins 86 can be determined in accordance with a standard (JIS) of a thread to be cut on the pipe 100. Although two kinds of threads are intended to be cut in the illustrated embodiment, a single thread or various kinds of threads can also be cut by decreasing or increasing the number of eccentric pins 86. (In FIG. 3, the left hand eccentric pin is adapted to cut, for example, a ¾" thread, and the right hand eccentric pin, for example, a ½" thread).

The free end of the lever 23 protrudes into the center opening of the annular plates 2 and 3 so as to be in contact with the pipe 100.

When the cutting operation approaches completion, the front end of the pipe 100 is brought into contact with the free end of the lever 23 and begins to gradually push the lever 23 in the right hand direction of FIG. 2, so that the lever 23 is caused to rotate about the pivot pin 25 in a counterclockwise direction of FIG. 2. By the rotation of the lever 23, the stop projection 23a of the lever 23 is gradually disengaged from the groove 42 of the slide 43. On the other hand, the slide 43 is always pressed in the direction designated by the arrow shown in FIG. 6, by the spring 29 and by the cutting torque applied to the projections 7. Therefore, when the projection 23a is gradually disengaged from the groove 42, the slide 43 and, accordingly, the plate 3 is gradually rotated, due to the presence of the inclined portion 42a of the groove 42. As a result, the cutting tools 9 are gradually retracted, thus resulting in the formation of a tapered thread on the pipe 100.

By a further movement of the pipe 100, the projection 23a of the lever 23 is completely disengaged from the groove 42. As soon as the projection 23a of the lever 23 is completely disengaged from the groove 42, the slide 43 is suddenly and substantially moved in the direction designated by the arrow shown in FIG. 5, by the spring 29, so that the plate 3 which is connected to the slide 43 is also suddenly and substantially rotated relative to the plate 2, thus resulting in a quick retraction of the cutting tools 9. At this stage, the cutting operation is completed. The cutting tools can thus be automatically and quickly retracted to their non-working positions, i.e., to their initial positions as soon as the cutting of the pipe is completed.

In order to return the slide 43 to its initial position, one of the plates 2 and 3 can be manually rotated.

Since the tapered groove 78 formed on the pivot arm 74 has an open lower end, it is possible to rotate the pivot arm 74 about the pivot pin 75 to bring the pivot arm to a non-operating position designated by the dotted-dashed line shown in FIG. 4 even after the eccentric pin 86 is once fitted into the tapered groove 78. Although the groove 78 is referred to as a tapered groove in the illustrated embodiment, it is not limited to a tapered groove. The groove must have an open lower end.

The workpiece to be cut is not limited to a pipe and may be of any kind of rod or bar material.

The cutting is not limited to a thread cutting, but includes various kinds of machining, such as taper thread cutting or chamferring.

A modification of the design of the position of the pivot pin 25 to which the lever 23 is pivoted or a modification of the shape of the lever 23 makes it possible to adjust the position at which the front end of the workpiece is brought into contact with the free end of the lever 23, thereby to adjust, for example, the length of the thread to be cut on the workpiece.

According to the invention, the length of the thread to be cut on the workpiece is substantially uniform, without requiring the skill of the operations, unlike the prior art cutting machine.

Figure 7:
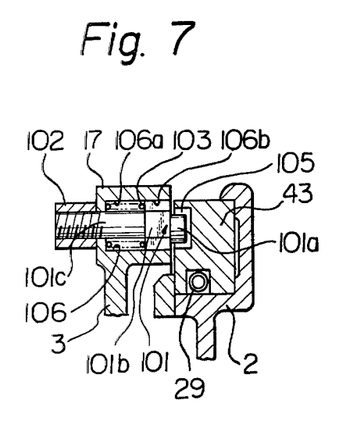
FIG. 7 is a view showing a variant of FIG. 4.
Figure 8:
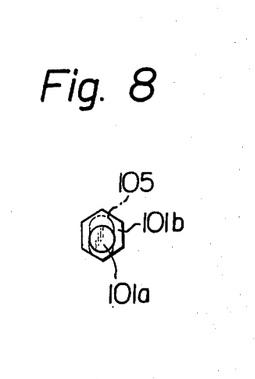
FIG. 8 is an end view of an eccentric pin of FIG. 7.

FIGS. 7 and 8 illustrate a variant of FIG. 4. In FIG. 7, the eccentric pin 101 is directly fitted into an elongated slot 105 of the slide 43. That is, a pivot arm 74 such as shown in FIG. 4 is not provided. The provision of the pivot arm 74 in FIG. 4 enables the eccentric pins 86 to be individually and finely pre-adjusted in the groove 78 of the pivot arm 74. That is, after one of the eccentric pins 86 is first rotated to effect a fine adjustment of the radial position of the cutting tools 9, it is necessary to draw the pivot arm 74 out from the one eccentric pin which has been set into position without moving the eccentric pin, so as to effect a similar adjustment of the adjacent eccentric pin. For this purpose, the pivot arm 74 has the inclined groove 78 which makes it possible to rotate the pivot arm 74 only about the pivot pin 75 to a position 74' shown by the dotted-dashed lines in FIG. 4 without moving the eccentric pins and the other elements. The pivot arm 74 can be deemed to be part of the slide 43, since the pivot arm 74 is integrally connected to the slide 43 via the pivot pin 75.

The embodiment illustrated in FIG. 7 ensures a fine adjustment of the cutting tools without requiring the provision of the pivot arm 74. According to this embodiment, after one of the eccentric pins 101 is preset to effect a fine adjustment of the cutting tools, the preset eccentric pin is drawn out from the elongated slot 105 formed in the slide 43 so as to effect a fine adjustment of an adjacent eccentric pin. Accordingly, it is very important to ensure that the preset eccentric pin 101 is not displaced when it is drawn from the elongated slot 105.

In order to satisfy this important requirement, each of the eccentric pins 101 must include a cylindrical eccentric portion 101a, a regular polygonal (a hexagonal shape in the illustrated embodiment) portion 101b (FIG. 8), and a shaft portion 101c having a decreased diameter. Each of holes 106 which are formed in the ledge 17 of the plate 3 has a polygonal hole portion 106b corresponding to the polygonal portion 101b and a circular hole portion 106a. Between the inner wall of each of the holes 106 and the polygonal portion 101b is arranged a spring 103 which always presses the eccentric pin 101 in the right hand direction of FIG. 7. Screwed onto the outer end of the eccentric pin 101 is a knob 102 which prevents the eccentric pin 101 from coming out from the hole 106 when under the influence of the spring force of a spring 103. The eccentric pin 101 can thus effect a number of fine adjustments corresponding to the number of the sides of the polygon of the regular polygonal portion 101b. That is, four kinds of fine adjustments can be effected in the illustrated embodiment. The outward displacement of the knob 102 and, accordingly, the eccentric pin 101 against the spring 103 disengages the polygonal portion 101b from the corresponding polygonal hole portion 106b so as to place the polygonal portion 101b into the circular hole portion 106a for rotating the eccentric pin 101. For example, when the eccentric pin 101 is rotated by one step, i.e., through an angle equal to an interior angle of the polygon, and the knob 102 is thereafter released, the eccentric pin is moved inwardly by the spring 103 so that the polygonal portion 101b is fitted and fixed into a polygonal hole portion 106b adjacent to the polygonal hole portion into which the polygonal portion 101b was originally fitted.

It should be noted that since the eccentric portion 101a of the eccentric pin 101 is fitted into the elongated slot 105 of the slide 43, the rotation of the eccentric pin causes a relative rotation between the plates 2 and 3 through an angle corresponding to an eccentricity "e" (FIG. 8), similar to the embodiment in FIG. 4. The shape and the position of the elongated slot 105 are shown in FIG. 8 by an imaginary line. It will be appreciated that the precision of the fine adjustments increases as the number of the sides of the polygon of the polygonal portion 101b increases.

According to the embodiment illustrated in FIGS. 7 and 8, the construction of the embodiment is simplified by not providing a pivot arm, and a uniform and reliable adjustment of the cutting tools is ensured by adopting a polygonal fine adjustment mechanism. Furthermore, no lock member such as the screw 81 as shown in FIG. 4 is necessary in the embodiment illustrated in FIGS. 7 and 8. Still furthermore, the positioning or adjustment of the cutting tools can be easily effected by using a one-touch operation consisting of the outward displacement and the rotational movement of the knob 102.

What is claimed is:

1. A die-head of a cutting machine comprising a pair of relatively rotatable annular plates each having a center opening into which a workpiece to be cut extends, which plates movably hold cutting tools therebetween so that said cutting tools can be radially displaced by the relative rotation of said annular plates, wherein an improvement comprises a tool retracting lever having a projection, said tool retracting lever being, at its one end, pivotally connected to one of said annular plates, and projecting, at its other end, in said center opening of said annular plates, said other end being positioned to be engaged by the workpiece as the cutting operation approaches completion, and a slide which is slidably mounted to said one annular plate and which is integrally connected to said other annular plate so as to move therewith, said slide being always pressed in a peripheral direction of said annular plates by a spring which is arranged between said slide and said one annular plate, said slide being provided with a recessed groove into which is engaged said projection of said tool retracting lever, whereby when said tool retracting lever is pushed and pivoted by said workpiece which axially moves in said opening of said annular plates, said projection of said lever is completely disengaged from said recessed groove of said slide, thus resulting in a sudden and substantial relative rotation of said annular plates to retract said cutting tools, wherein said recessed groove of said slide into which is engaged said projection of said tool retracting lever comprises an inclined taper portion so that the slide movement of said slide gradually occurs as the cutting operation approaches completion to thereby gradually retract the cutting tools until said projection of said tool retracting lever is completely disengaged from said recessed groove of said slide.

2. A die-head for machining the end of a workpiece having a longitudinal axis of rotation along which relative movement between said workpiece and said die-head takes place, said die-head comprising, in combination:
   a plurality of cutting tools;
   means, including a pair of plates relatively rotatable about a first axis, for supporting said tools and causing movement thereof radially of said axis between working and retracted positions;
   resilient means for causing relative rotation between said plates in a first sense to displace said tools into said retracted position;
   releasable means including a pivotable lever which is positioned to be actuated by the workpiece as the cutting operation approaches completion, said lever engaging a recess in said resilient means for maintaining said plates in a rotated displacement in a sense opposite to said first sense, to displace said tools into said working position; and
   means including said recess comprising a tapered portion therein for causing controlled release of said releasable means so as to initially cause slow partial retraction of said tools as the cutting operation approaches completion and then cause sudden complete retraction thereof when said lever is completely disengaged from said recess.

3. A die-head according to claim 2 wherein said lever comprises a retracting lever pivoted to one of said plates about a second axis orthogonal to said first axis and having a first portion projecting radially in the same direction as said cutting tools for engagement by the end of a workpiece, and a second portion for engaging said resilient means, to prevent relative rotation between said plates.

4. A die-head according to claim 2 in which said resilient means comprises a slide moveable peripherally between first and second positions with respect to one of said plates, and means removably fastening said slide to the other of said plates for unitary motion therewith.

5. A die-head according to claim 2 in which said lever comprises a retraction lever pivoted to one of said plates about a second axis orthogonal to said first axis and having a first portion projecting radially in the same direction as said cutting tools for engagement by the end of a workpiece, and a second portion for engaging said resilient means, to prevent relative rotation between said plates, and in which said resilient means comprises a slide movable peripherally between first and second positions with respect to one of said plates and means removably fastening said slide to the other of said plates for unitary motion therewith, said slide comprising a tapered recess for engagement by said second portion of said lever.

6. A die-head according to claim 3 including resilient means urging said lever into a position in which said second portion engages said resilient means.

7. A die-head according to claim 4 in which the last named means includes a pivot arm carried by said slide and a pin carried by said other of said plates for engaging said pivot arm.

8. A die-head according to claim 7 in which said pin is eccentric and is rotatable about an axis to vary the site of engagement with said pivot arm.

9. A die-head according to claim 7 in which the last named means includes a slot carried by said slide and a pin carried by said other of said plates and movable axially into engagement with said slot.

10. A die-head according to claim 9 in which said pin is eccentric and is rotatable about an axis to vary the site of engagement with said slot.

11. A die-head according to claim 9 in which said pin is eccentric and includes a portion of polygonal cross section, and said other of said plates has a polygonal aperture of the same section.

* * * * *

UNITED STATES PATENT AND TRADEMARK OFFICE
CERTIFICATE OF CORRECTION

PATENT NO. : 4,288,181

DATED : September 8, 1981

INVENTOR(S) : Ryo Sakaguchi et al.

It is certified that error appears in the above—identified patent and that said Letters Patent is hereby corrected as shown below:

Column 2, line 32, change the word "provided" to --pivoted--.

Signed and Sealed this

Second Day of February 1982

[SEAL]

Attest:

Attesting Officer

GERALD J. MOSSINGHOFF

Commissioner of Patents and Trademarks